(12) United States Patent
Fu et al.

(10) Patent No.: US 10,389,200 B2
(45) Date of Patent: Aug. 20, 2019

(54) WIRING TERMINAL AND MOTOR COMPRISING THE SAME

(71) Applicant: Zhongshan Broad-Ocean Motor Co., Ltd., Zhongshan (CN)

(72) Inventors: Guiwen Fu, Zhongshan (CN);
Xiongcheng Wang, Zhongshan (CN);
Jincheng Zhu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 312 days.

(21) Appl. No.: 15/390,691

(22) Filed: Dec. 26, 2016

(65) Prior Publication Data

US 2017/0110925 A1  Apr. 20, 2017

Related U.S. Application Data

(63) Continuation-in-part of application No. PCT/CN2015/090339, filed on Sep. 23, 2015.

(30) Foreign Application Priority Data

Jun. 23, 2015 (CN) .................... 2015 2 0435528 U

(51) Int. Cl.
| | | |
|---|---|---|
| *H02K 3/52* | (2006.01) | |
| *H01R 11/11* | (2006.01) | |
| *H02K 1/14* | (2006.01) | |
| *H02K 3/18* | (2006.01) | |
| *H02K 5/02* | (2006.01) | |
| *H01R 4/14* | (2006.01) | |

(52) U.S. Cl.
CPC .............. *H02K 3/521* (2013.01); *H01R 4/14* (2013.01); *H01R 11/11* (2013.01); *H02K 1/145* (2013.01); *H02K 3/18* (2013.01); *H02K 3/522* (2013.01); *H02K 5/02* (2013.01)

(58) Field of Classification Search
CPC .......... H02K 3/521; H02K 3/18; H02K 3/522; H02K 1/145; H02K 5/02; H01R 4/14; H01R 11/11
See application file for complete search history.

(56) References Cited

U.S. PATENT DOCUMENTS

| | | | | |
|---|---|---|---|---|
| 2006/0238045 | A1* | 10/2006 | Hatano | ................... F16K 31/04 310/71 |
| 2007/0001526 | A1* | 1/2007 | Okada | ................... H02K 3/522 310/71 |
| 2015/0207371 | A1* | 7/2015 | Duncan | ................ D06F 37/206 68/3 R |

* cited by examiner

*Primary Examiner* — Jue Zhang
(74) *Attorney, Agent, or Firm* — Matthias Scholl P.C.; Matthias Scholl

(57) ABSTRACT

A wiring terminal and a motor including the wiring terminal are provided. The wiring terminal includes: a mounting subassembly adapted to embed in a slot of an end insulator of a motor, a connection subassembly configured to support a wire stock having a lead wire, and a winding subassembly configure to receive an enameled wire wound on the winding subassembly. The connection subassembly and the winding subassembly are disposed on the top surface of the mounting subassembly. The lead wire of the wire stock is electrically connected to the enameled wire wound on the winding subassembly.

14 Claims, 7 Drawing Sheets

WIRING TERMINAL AND MOTOR COMPRISING THE SAME

CROSS-REFERENCE TO RELATED APPLICATIONS

This application is a continuation-in-part of International Patent Application No. PCT/CN2015/090339 with an international filing date of Sep. 23, 2015, designating the United States, now pending, and further claims foreign priority benefits to Chinese Patent Application No. 201520435528.1 filed Jun. 23, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to a wiring terminal and a motor comprising the same.

Description of the Related Art

The wiring processes for conventional motors include: electrically connecting the enameled wire and the lead wire, sheathing the joint of the enameled wire and the lead wire in an insulating sleeve, and fixing the insulating sleeve in a slot on the top of the end insulator. However, it is difficult to connect the enameled wire and the lead wire, and the connection is insecure, time and labor consuming.

SUMMARY OF THE INVENTION

In view of the above-described problems, it is one objective of the invention to provide a wiring terminal which is reliable and efficient in connecting a lead wire and an enameled wire.

It is another objective of the invention to provide a motor.

To achieve the above objective, in accordance with one embodiment of the invention, there is provided a wiring terminal, comprising a mounting subassembly adapted to embed in a slot of an end insulator of a motor, a connection subassembly configured to support a wire stock having a lead wire, and a winding subassembly configure to receive an enameled wire wound on the winding subassembly. The connection subassembly and the winding subassembly are disposed on the top surface of the mounting subassembly. The lead wire of the wire stock is electrically connected to the enameled wire wound on the winding subassembly.

In a class of this embodiment, the connection subassembly comprises at least one connecting sheet. The at least one connecting sheet protrudes outwards from the top surface of the mounting subassembly. The at least one connecting sheet comprises a notch formed by bending upwards and inwards a free end of the at least one connecting sheet. The notch is adapted to clamp and squeeze the wire stock.

In a class of this embodiment, the winding subassembly comprises a winding post protruding from the top surface of the mounting subassembly.

In a class of this embodiment, the at least one connecting sheet is two in number; two connecting sheets are disposed side-by-side on the top surface of the mounting subassembly, and protrude in the same direction; and the winding post is located between the two connecting sheets, and protrudes in a direction away from the two connecting sheets.

In a class of this embodiment, a lower part of the winding post is bent inwards and forms a fixing member adapted to squeeze and fix the wire stock in the notch.

In a class of this embodiment, two sides of a free end of the winding post protrude to form a lug boss, and the winding post is T-shaped.

In a class of this embodiment, the mounting subassembly comprises a mounting sheet; one surface of the mounting sheet comprises a convex part, and the other surface of the mounting sheet is provided with a concave part; and the convex part is corresponding to the concave part.

In another aspect, the invention provides a motor, comprising a rotary shaft, a plastic-packaged stator, and an external rotor. The plastic-packaged stator is disposed in a chamber of the external rotor. The plastic-packaged stator comprises a sleeve base, a stator core, an end insulator, coil windings, and a plastic-packaged body. The end insulator is disposed on one end surface of the stator core. The coil windings are wound on the end insulator. The sleeve base is disposed in a shaft hole of the stator core. Bearing housings are disposed on two ends of the sleeve base. A bearing is disposed in each bearing housing. The rotary shaft is disposed in the sleeve base, and two ends of the rotary shaft are supported by the bearing. The sleeve base, the stator core, the end insulator, and the coil windings are disposed in the plastic-packaged body. One end of the rotary shaft protrudes out from the sleeve base and is connected to the external rotor. The end insulator is provided with a slot, and a wiring terminal is embedded in the slot. The wiring terminal comprises a mounting subassembly adapted to embed in a slot of an end insulator of a motor, a connection subassembly configured to support a wire stock having a lead wire, and a winding subassembly configure to receive an enameled wire wound on the winding subassembly. The connection subassembly and the winding subassembly are disposed on the top surface of the mounting subassembly. The connection subassembly is adapted to clamp and squeeze the wire stock. The lead wire of the wire stock is electrically connected to the enameled wire wound on the winding subassembly.

Advantages of the wiring terminal and the motor according to embodiments of the invention are summarized as follows:

1. The connection subassembly and the winding subassembly are disposed on the top surface of the mounting subassembly. The connection subassembly is adapted to clamp and squeeze the wire stock. The enameled wire is wound on the winding subassembly. The wiring terminal enables the enameled wire connect to the lead wire, which is practicable and efficient, and saves a large amount of labor and time.

2. The connection subassembly comprises at least one connecting sheet. The at least one connecting sheet protrudes outwards from the top surface of the mounting subassembly. The at least one connecting sheet comprises a notch formed by bending upwards and inwards a free end of the at least one connecting sheet. The notch is adapted to clamp and squeeze the wire stock. The connection between the lead wire and the wiring terminal is secure.

3. The lower part of the winding post is bent inwards and forms a fixing member. The fixing member is adapted to squeeze and fix the wire stock in the notch. The lead wire is fixed in the notch, ensuring the reliability.

4. Two sides of the free end of the winding post protrude to form a lug boss, and the winding post is T-shaped, thus effectively preventing the enameled wire from detaching from the winding post, and ensuring the reliable connection between the enameled wire and the winding post.

5. One surface of the mounting sheet comprises a convex part, and the other surface of the mounting sheet is provided with a concave part. The convex part is corresponding to the concave part. The convex part and the concave part work to effectively fix the mounting sheet in the slot of the end insulator, ensuring the secure and reliable installation.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a wiring terminal and a motor comprising the same are described below. It should be noted that the following examples are intended to describe and not to limit the invention.

EXAMPLE 1

Figure 1:
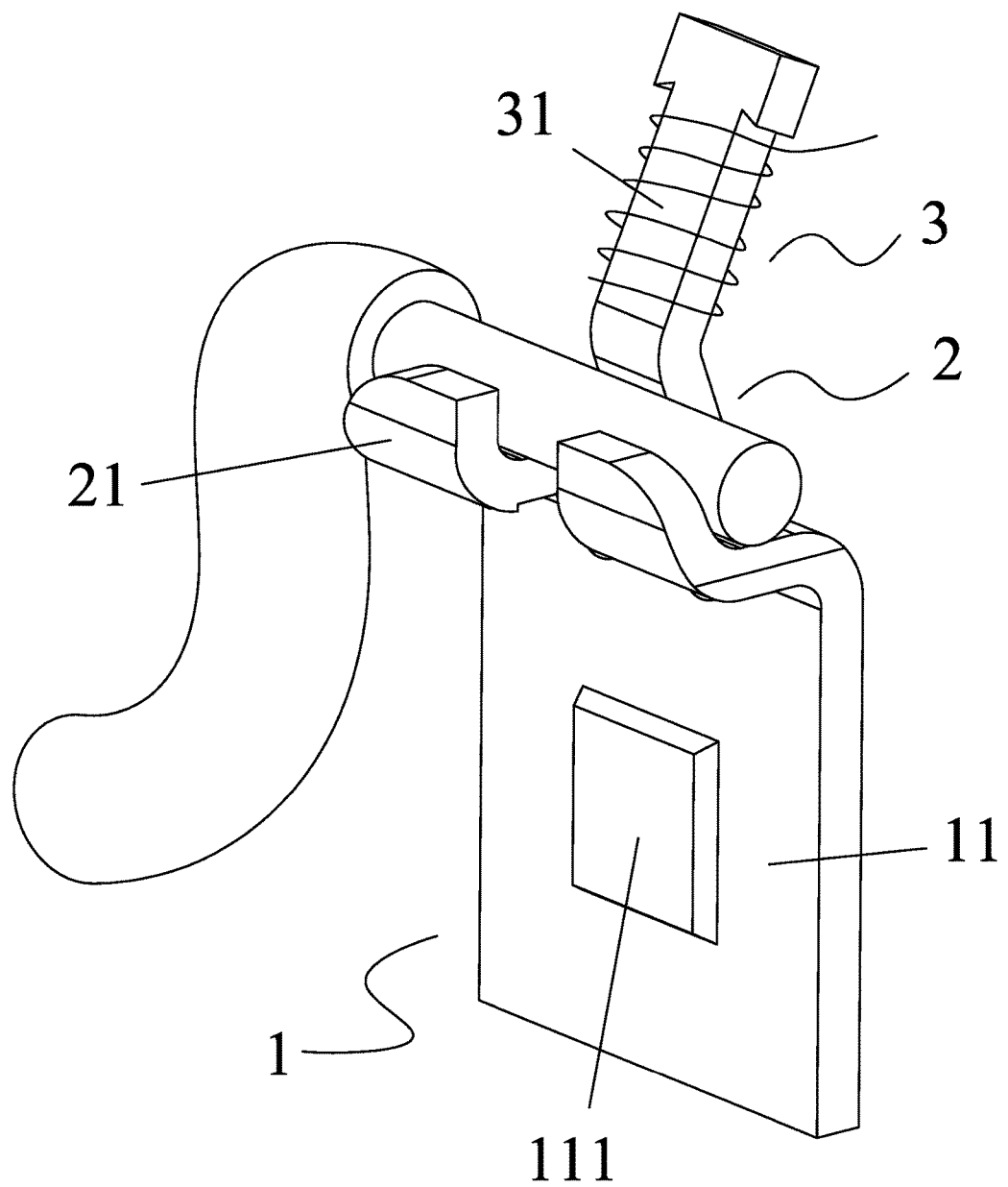
FIG. 1 is a first schematic diagram showing a wiring on a wiring terminal in accordance with one embodiment of the invention.
Figure 2:
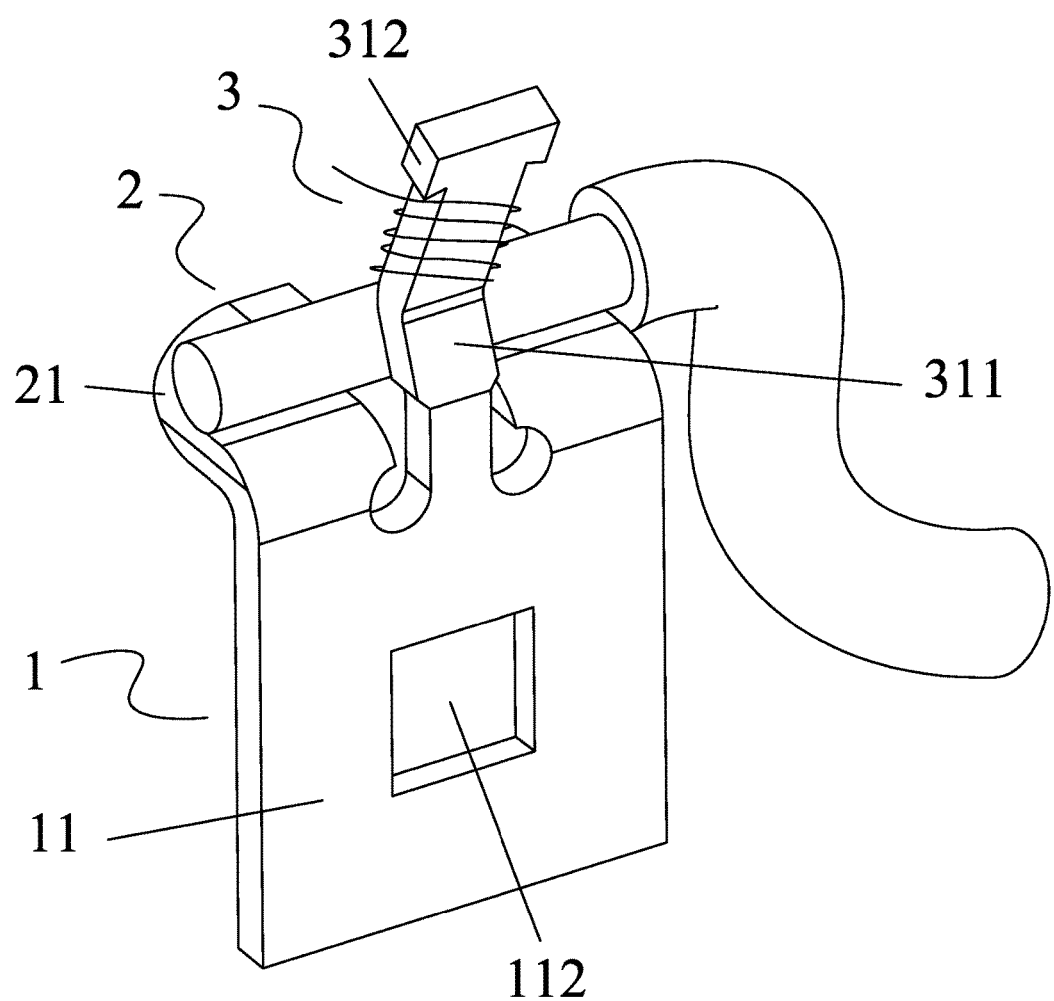
FIG. 2 is a second schematic diagram showing a wiring on a wiring terminal in accordance with one embodiment of the invention.
Figure 3:
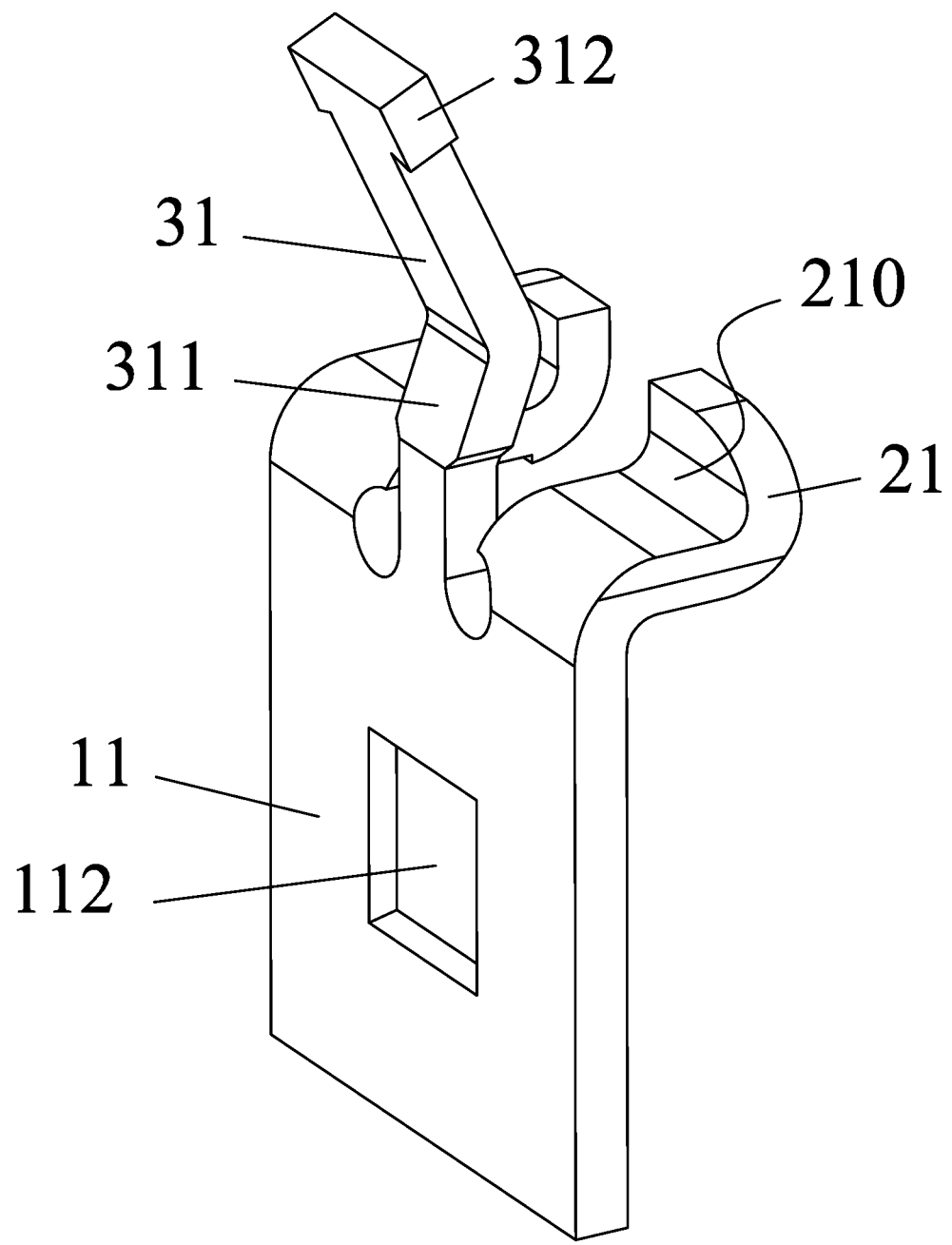
FIG. 3 is a stereogram of a wiring terminal in accordance with one embodiment of the invention.
Figure 4:
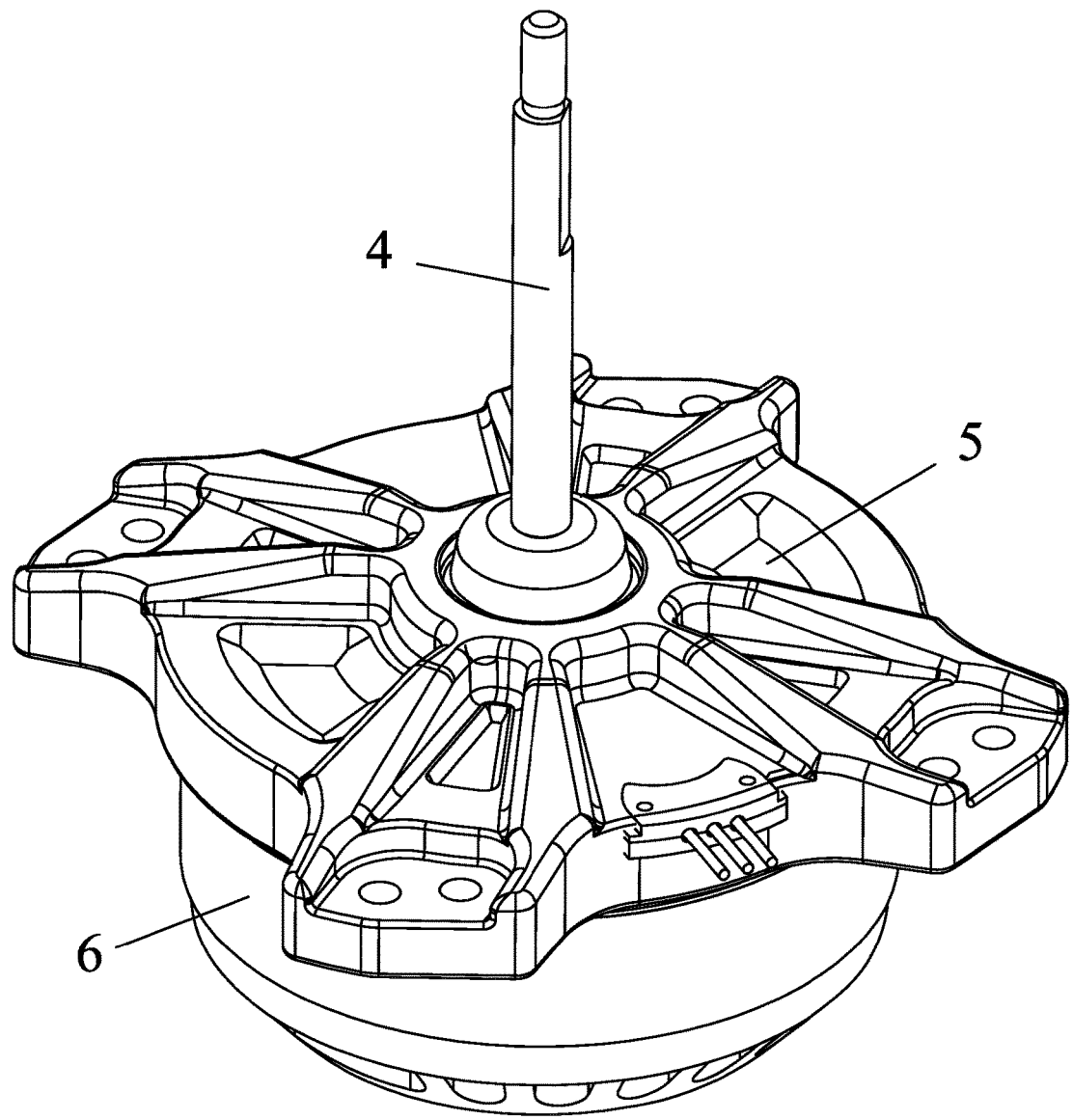
FIG. 4 is a stereogram of an external rotor motor in accordance with one embodiment of the invention.
Figure 5:
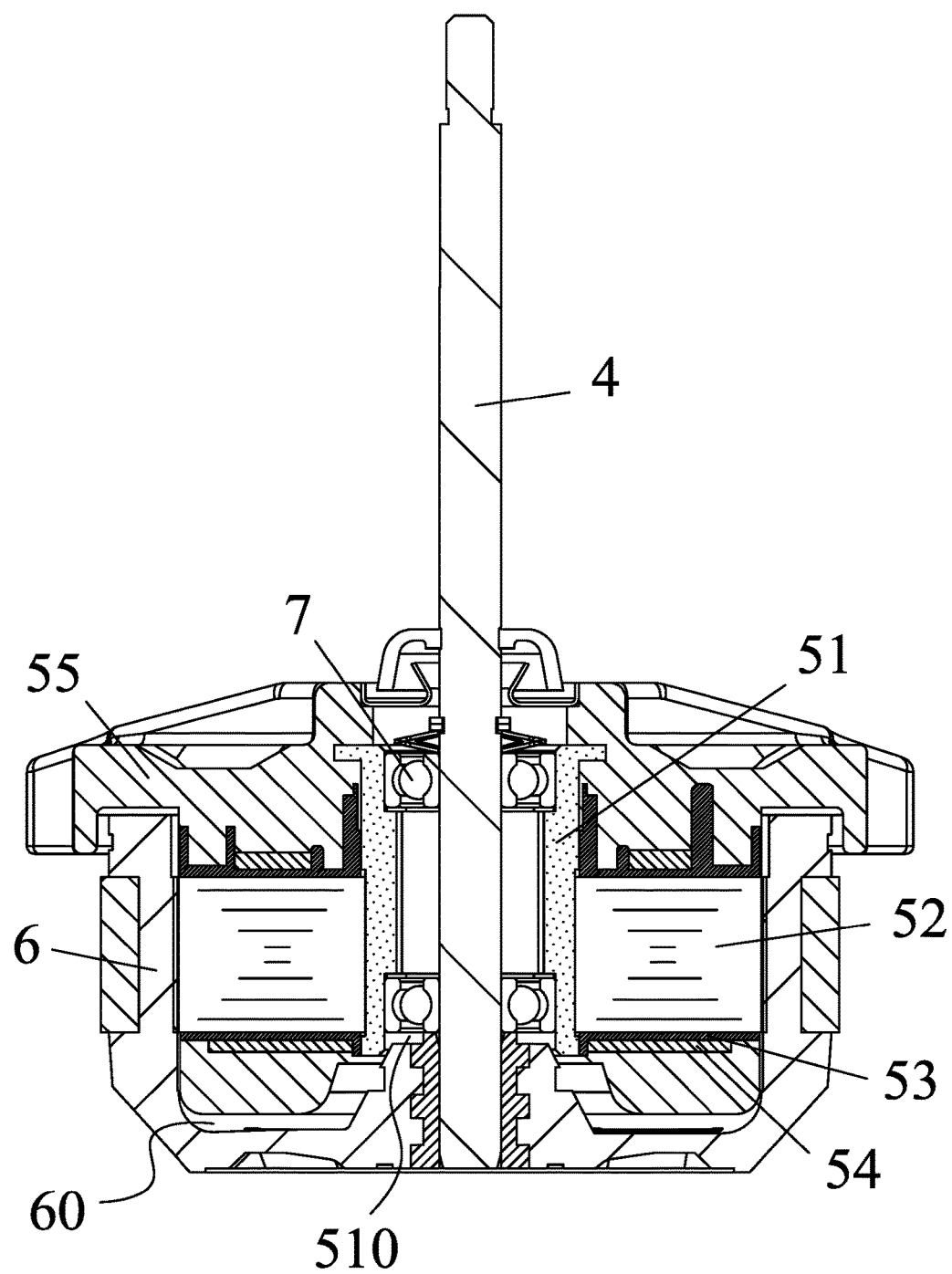
FIG. 5 is a schematic diagram of an external rotor motor in accordance with one embodiment of the invention.
Figure 6:
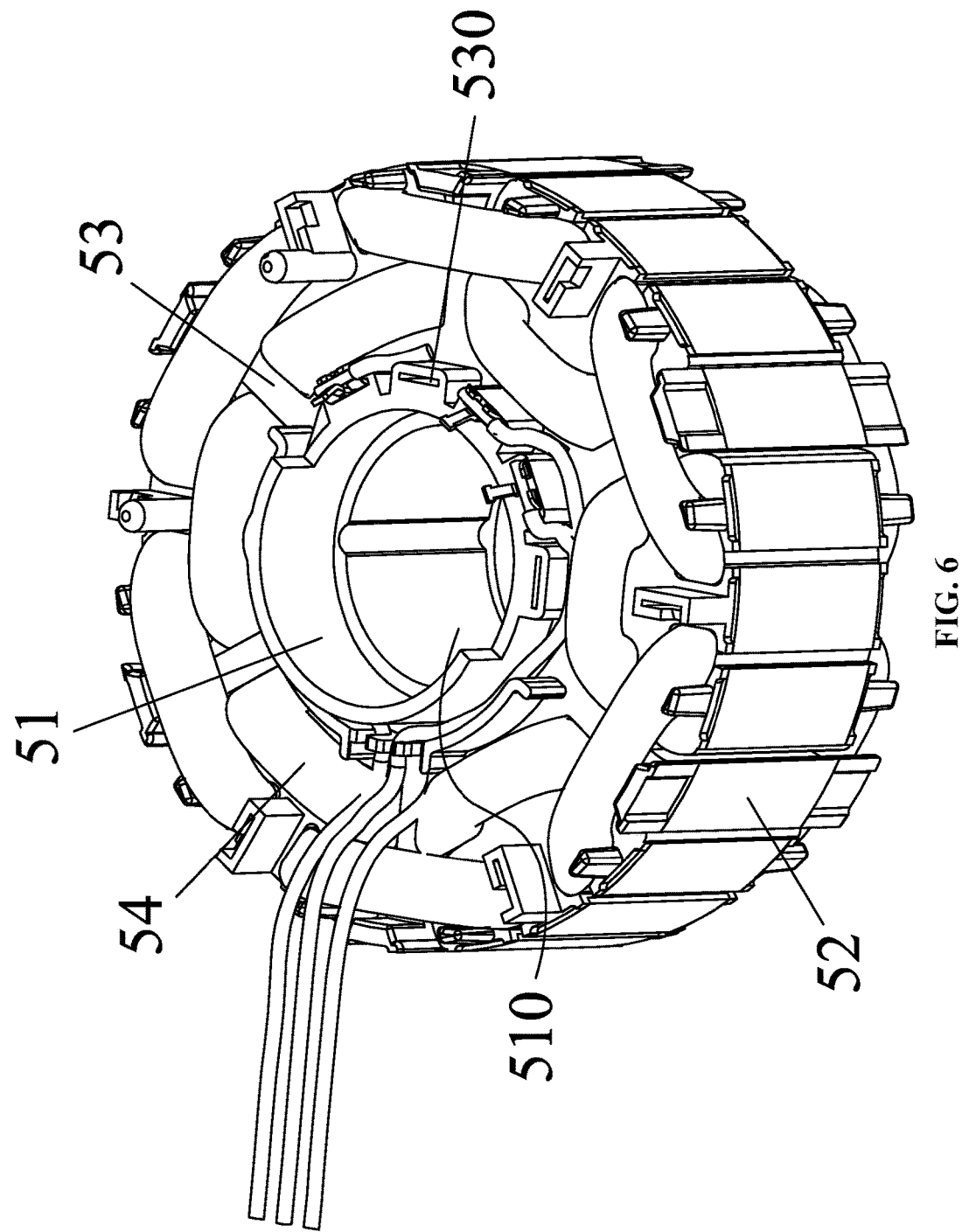
FIG. 6 is a first stereogram of a plastic-packaged stator in accordance with one embodiment of the invention.
Figure 7:
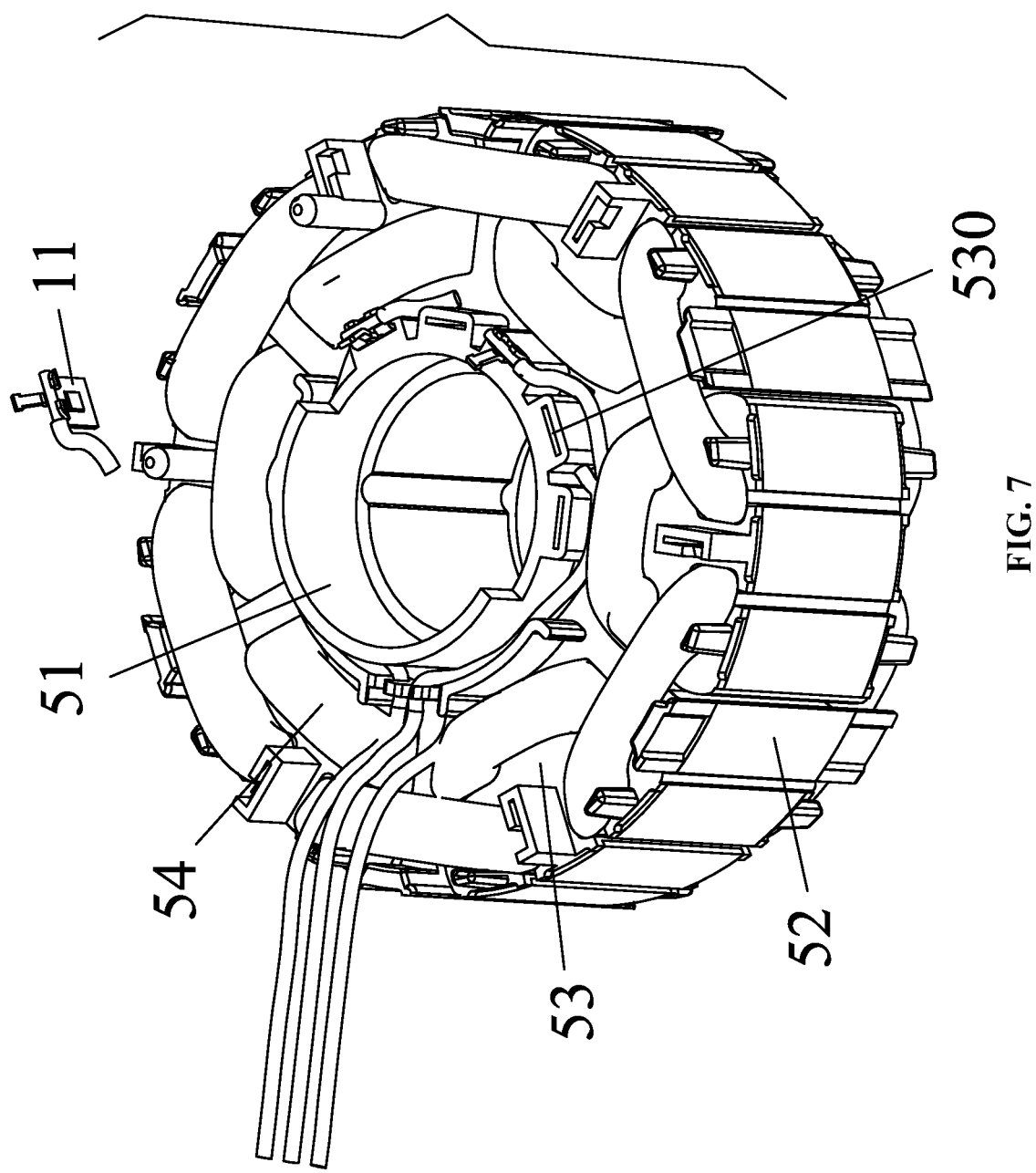
FIG. 7 is a second stereogram of a plastic-packaged stator in accordance with one embodiment of the invention.

As shown in FIGS. 1-3, a wiring terminal comprises a mounting subassembly 1, a connection subassembly 2, and a winding subassembly 3. The connection subassembly and the winding subassembly are disposed on the top surface of the mounting subassembly 1. The connection subassembly is adapted to clamp and squeeze a wire stock. An enameled wire is wound on the winding subassembly. As shown in FIGS. 1-2, the wire stock is squeezed by a notch 210, and the enameled wire is wound on a winding post 31. The connection subassembly 2 comprises at least one connecting sheet 21. The at least one connecting sheet protrudes outwards from the top surface of the mounting subassembly 1. The at least one connecting sheet 21 is bent upwards to form the notch 210. The notch is adapted to clamp and squeeze the wire stock. The winding subassembly 3 comprises the winding post 31. The winding post protrudes from the top surface of the mounting subassembly 1. The at least one connecting sheet 21 is two in number. Two connecting sheets 21 are disposed side-by-side on the top surface of the mounting subassembly 1, and protrude in the same direction. The winding post 31 is located between the two connecting sheets 21, and the winding post 31 protrudes in a direction away from the two connecting sheets. The lower part of the winding post 31 is bent inwards and forms a fixing member 311. The fixing member is adapted to squeeze and fix the wire stock in the notch 210. Two sides of a free end of the winding post 31 protrude to form a lug boss 312, and the winding post is T-shaped. The mounting subassembly 1 comprises a mounting sheet 11. One surface of the mounting sheet 11 comprises a convex part 111, and the other surface of the mounting sheet is provided with a concave part 112. The convex part 111 is corresponding to the concave part 112.

EXAMPLE 2

As shown in FIGS. 1-7, an external rotor motor comprises a rotary shaft 4, a plastic-packaged stator 5, and an external rotor 6. The plastic-packaged stator 5 is disposed in a chamber 60 of the external rotor 6. The plastic-packaged stator 5 comprises a sleeve base 51, a stator core 52, an end insulator 53, coil windings 54, and a plastic-packaged body 55. The end insulator 53 is disposed on one end surface of the stator core 52. The coil windings 54 are wound on the end insulator 53. The sleeve base 51 is disposed in a shaft hole of the stator core 52. Bearing housings 510 are disposed on two ends of the sleeve base 51. A bearing 7 is disposed in each bearing housing 510. The rotary shaft 4 is disposed in the sleeve base 51, and two ends of the rotary shaft are supported by the bearing 7. The sleeve base 51, the stator core 52, the end insulator 53, and the coil windings 54 are disposed in the plastic-packaged body 55. One end of the rotary shaft 4 protrudes out from the sleeve base 51 and is connected to the external rotor 6. The end insulator 53 is provided with a slot 530, and a wiring terminal is embedded in the slot 530. The wiring terminal comprises a mounting subassembly 1, a connection subassembly 2, and a winding subassembly 3. The connection subassembly and the winding subassembly are disposed on the top surface of the mounting subassembly 1. The connection subassembly is adapted to clamp and squeeze a wire stock having a lead wire. An enameled wire is wound on the winding subassembly. The lead wire of the wire stock is electrically connected to the enameled wire wound on the winding subassembly. The mounting subassembly 1 is embedded in the slot 530.

The above embodiments are preferred embodiments of the invention, and the invention is not limited by the above embodiments. For instance, the wiring terminal can also be applied to an internal rotor motor which comprises an end insulator; the end insulator of the internal rotor motor comprises a slot, and the wiring terminal is embedded in the slot.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A wiring terminal, comprising:
a mounting subassembly, the mounting subassembly comprising a mounting sheet having a first end and a second end opposite to each other; the first end of the mounting sheet being adapted to be inserted in a slot of an end insulator of a motor;
a supporting subassembly, the supporting subassembly comprising a supporting sheet that is adapted to support a wire stock having a lead wire; and
a winding subassembly, the winding subassembly comprising a winding post that is adapted to receive an enameled wire wound on the winding post;

wherein:
the supporting subassembly and the winding subassembly are disposed on the second end of the mounting subassembly; and
the lead wire of the wire stock is adapted to be electrically connected to the enameled wire wound on the winding subassembly;
the supporting sheet protrudes from the second end of the mounting sheet, and extends away from the winding post and substantially along a transversal direction that is perpendicular to the mounting sheet;
the winding post protrudes from the second end of the mounting sheet, and extends substantially along a longitudinal direction that is parallel to the mounting sheet and that extends from the first end of the mounting sheet toward the second end of the mounting sheet;
a free end of the supporting sheet extends toward the winding post and substantially along the longitudinal direction; and
a notch is confined by the supporting sheet and the winding post for securing the lead wire of the wire stock, wherein the notch has a u-shape cross section and extends along a direction that is substantially perpendicular to the longitudinal direction.

2. The wiring terminal of claim 1, wherein the supporting sheet is two in number; the two supporting sheets respectively protrude from two edges of the second end of the mounting subassembly in the same direction; and the winding post is located between the two supporting sheets, and extends in a direction away from the two supporting sheets.

3. The wiring terminal of claim 2, wherein a lower part of the winding post extends toward the two supporting sheets and is adapted to squeeze and fix the wire stock in the notch.

4. The wiring terminal of claim 3, wherein two lug bosses protrude from two sides of a free end of the winding post, respectively; and the winding post is T-shaped.

5. The wiring terminal of claim 3, wherein one surface of the mounting sheet comprises a convex part, and the other surface of the mounting sheet is provided with a concave part; and the convex part is corresponding to the concave part.

6. The wiring terminal of claim 2, wherein two lug bosses protrude from two sides of a free end of the winding post, respectively; and the winding post is T-shaped.

7. The wiring terminal of claim 2, wherein one surface of the mounting sheet comprises a convex part, and the other surface of the mounting sheet is provided with a concave part; and the convex part is corresponding to the concave part.

8. The wiring terminal of claim 1, wherein two lug bosses protrude from two sides of a free end of the winding post, respectively; and the winding post is T-shaped.

9. The wiring terminal of claim 1, wherein one surface of the mounting sheet comprises a convex part, and the other surface of the mounting sheet is provided with a concave part; and the convex part is corresponding to the concave part.

10. A motor, comprising a wiring terminal of claim 1.

11. The motor of claim 10, comprising:
a rotary shaft;
a plastic-packaged stator, the plastic-packaged stator comprising a sleeve base, a stator core, an end insulator, coil windings, and a plastic-packaged body; and
an external rotor comprising a chamber;
wherein
the plastic-packaged stator is disposed in the chamber of the external rotor;
the end insulator is disposed on one end surface of the stator core; the coil windings are wound on the end insulator; the sleeve base is disposed in a shaft hole of the stator core; bearing housings are disposed on two ends of the sleeve base; a bearing is disposed in each bearing housing; the rotary shaft is disposed in the sleeve base, and two ends of the rotary shaft are supported by the bearing; the sleeve base, the stator core, the end insulator, and the coil windings are disposed in the plastic-packaged body; one end of the rotary shaft protrudes out from the sleeve base and is connected to the external rotor; and
the end insulator is provided with a slot, and the wiring terminal is embedded in the slot.

12. The motor of claim 10, wherein the supporting sheet is two in number; the two supporting sheets respectively protrude from two edges of the second end of the mounting subassembly in the same direction; and the winding post is located between the two supporting sheets, and extends in a direction away from the two supporting sheets.

13. The motor of claim 12, wherein a lower part of the winding post extends toward the two supporting sheets and is adapted to squeeze and fix the wire stock in the u-shaped notch.

14. The wiring terminal of claim 13, wherein two lug bosses protrude from two sides of a free end of the winding post, respectively; and the winding post is T-shaped.

* * * * *